(12) United States Patent
Cheng

(10) Patent No.: US 10,550,936 B2
(45) Date of Patent: Feb. 4, 2020

(54) STEPLESS TRANSMISSION CAPABLE OF OPERATING CONTINUOUSLY

(71) Applicant: MOTIVE POWER INDUSTRY CO., LTD., Dacun Township (TW)

(72) Inventor: Hsin-Lin Cheng, Dacun Township (TW)

(73) Assignee: MOTIVE POWER INDUSTRY CO., LTD. (TW)

( * ) Notice: Subject to any disclaimer, the term of this patent is extended or adjusted under 35 U.S.C. 154(b) by 49 days.

(21) Appl. No.: 16/043,225

(22) Filed: Jul. 24, 2018

(65) Prior Publication Data
US 2019/0128413 A1 May 2, 2019

(30) Foreign Application Priority Data
Oct. 31, 2017 (TW) .............................. 106137591 A

(51) Int. Cl.
*F16H 61/66* (2006.01)
*F16H 15/28* (2006.01)
*F16H 37/08* (2006.01)

(52) U.S. Cl.
CPC ............ *F16H 61/66* (2013.01); *F16H 15/28* (2013.01); *F16H 37/086* (2013.01); *F16H 2061/6604* (2013.01); *F16H 2200/201* (2013.01); *F16H 2200/2069* (2013.01)

(58) Field of Classification Search
CPC .............................................. F16H 2061/6604
See application file for complete search history.

(56) References Cited

U.S. PATENT DOCUMENTS

| | | | | |
|---|---|---|---|---|
| 5,318,486 A | * | 6/1994 | Lutz | B62M 11/12 475/207 |
| 2007/0155567 A1 | * | 7/2007 | Miller | B62M 9/08 475/37 |
| 2011/0165987 A1 | * | 7/2011 | Hoffman | B60K 6/365 475/214 |
| 2017/0051815 A1 | * | 2/2017 | Janson | F16H 37/022 |
| 2019/0154147 A1 | * | 5/2019 | Lohr, III | F16H 3/663 |

* cited by examiner

*Primary Examiner* — Timothy Hannon
(74) *Attorney, Agent, or Firm* — Schmeiser, Olsen & Watts, LLP

(57) ABSTRACT

A stepless transmission capable of operating continuously having a supportive rotating element; a plurality of transmission spheres disposed on the supportive rotating element; a plurality of driving rods rotatably connected to the transmission spheres; a power input clamping rotating element; a power output clamping rotating element, wherein the transmission spheres are disposed between the power input clamping rotating element, power output clamping rotating element and supportive rotating element; an accelerating planet gear train; a first decelerating planet gear train; a transmission shaft; a first one-way transmission rotating element connected between the transmission shaft and a carrier of the planet gear train; a second one-way transmission rotating element connected between the carrier of the planet gear train and a first carrier of the first decelerating planet gear train. Therefore, the stepless transmission capable of operating continuously to transmit power instantly and steadily.

5 Claims, 7 Drawing Sheets

US 10,550,936 B2

STEPLESS TRANSMISSION CAPABLE OF OPERATING CONTINUOUSLY

CROSS-REFERENCE TO RELATED APPLICATION

This non-provisional application claims priority under 35 U.S.C. § 119(a) on Patent Application No(s). 106137591 filed in Taiwan, R.O.C. on Oct. 31, 2017, the entire contents of which are hereby incorporated by reference.

FIELD OF THE INVENTION

The present disclosure relates to stepless transmissions capable of changing through a continuous range of gear ratios and, more particularly, to a stepless transmission capable of changing gear ratios instantly and steadily.

BACKGROUND OF THE INVENTION

TWI571576B discloses a linear gear-driven power delivery mechanism which essentially comprises, sequentially, a power input rotating element, a ball ring, a power input clamping ring, a plurality of transmission spheres, a power output clamping ring, another ball ring and a power output rotating element. The transmission spheres are supported by a supportive rotating element and have their rotation controlled by a plurality of driving rods. The power input rotating element is resiliently connected to the power input clamping ring through a helical elastomer. The power output rotating element is resiliently connected to the power output clamping ring through another helical elastomer. The power input rotating element transmits power, by the ball ring, to the power input clamping ring such that the power input clamping ring and the power output clamping ring can clamp the transmission spheres, allowing the power output rotating element to output power through the other ball ring. However, the power input rotating element can stretch the helical elastomer, only if the power input rotating element rotates quickly enough, i.e., at or above a threshold rotation speed, to generate a centrifugal force great enough to permit the stretching of the helical elastomer; and, this is a prerequisite for clamping the transmission spheres by the power input clamping ring and the power output clamping ring and thereby outputting power from the power output rotating element. The conventional linear gear-driven power delivery mechanism is applicable to a bicycle, albeit inefficiently. The power input clamping ring and the power output clamping ring fail to clamp the transmission spheres whenever the power input rotating element rotates below the threshold rotation speed (for example, at the moment when the bicycle starts or when its two pedals are aligned vertically during a climb.) The failure to clamp the transmission spheres leads to idling, thereby rendering power transmission tardy and unsteady. The expedient solution to this problem is for the cyclist to cycle hard enough for the power input rotating element to reach the threshold rotation speed.

Therefore, it is imperative to provide a stepless transmission capable of operating continuously to enable instant, stable transmission of power.

SUMMARY OF THE INVENTION

In view of the aforesaid drawbacks of the prior art, it is an objective of the present disclosure to provide a stepless transmission capable of operating continuously to enable instant, stable transmission of power.

In order to achieve the above and other objectives, the present disclosure provides a stepless transmission capable of operating continuously, comprising: a supportive rotating element; a plurality of transmission spheres disposed at a circumference of the supportive rotating element and spaced apart; a plurality of driving rods which the transmission spheres are rotatably connected to, respectively; a power input clamping rotating element having an inward-tilting power input clamping annular surface; a power output clamping rotating element having an inward-tilting power output clamping annular surface, with the transmission spheres movably clamped between the inward-tilting power input clamping annular surface, the inward-tilting power output clamping annular surface and the supportive rotating element; an accelerating planet gear train having a sun gear, a plurality of planet gears, a carrier and a ring gear, the planet gears being meshed between the sun gear and the ring gear and rotatably connected to the carrier, and the sun gear being connected to the power input clamping rotating element; a first decelerating planet gear train having a first sun gear, a plurality of first planet gears, a first carrier and a first ring gear, the first planet gears being meshed between the first sun gear and the first ring gear and rotatably connected to the first carrier, and the first carrier being rotatably connected to the carrier; a transmission shaft rotatably connected to the first sun gear, the carrier, the sun gear, the power input clamping rotating element, the supportive rotating element and the power output clamping rotating element; a first one-way transmission rotating element connected between the transmission shaft and the carrier, allowing the transmission shaft to transmit the carrier unidirectionally; and a second one-way transmission rotating element connected between the carrier and the first carrier, allowing the first carrier to transmit the carrier unidirectional, wherein a transmission direction of the first one-way transmission rotating element is opposite to a transmission direction of the second one-way transmission rotating element.

The stepless transmission capable of operating continuously further comprises a second decelerating planet gear train having a second sun gear, a plurality of second planet gears, a second carrier and a second ring gear, the second planet gears being meshed between the second sun gear and the second ring gear and rotatably connected to the second carrier, the second carrier being connected to the first sun gear, the transmission shaft being rotatably connected to the second sun gear, the second carrier, the first sun gear, the carrier, the sun gear, the power input clamping rotating element, the supportive rotating element and the power output clamping rotating element.

Regarding the stepless transmission capable of operating continuously, the supportive rotating element has two supportive wheels, the supportive wheels each having an outward-tilting supportive annular surface, with the transmission spheres supported and held between the outward-tilting supportive annular surfaces and movably clamped between the inward-tilting power input clamping annular surface, the inward-tilting power output clamping annular surface and the outward-tilting supportive annular surfaces, with the transmission shaft rotatably connected to the supportive wheels.

Regarding the stepless transmission capable of operating continuously, inward end portions of the driving rods are rotatably connected to the transmission spheres, respectively, in a radial direction of the supportive rotating element, and outward end portions of the driving rods are exposed from the transmission spheres, allowing the driving rods to rotate to exit the radial direction of the supportive rotating element and thus approach an axial direction of the supportive rotating element.

Regarding the stepless transmission capable of operating continuously, the first one-way transmission rotating element is a one-way ratchet or one-way bearing, and the second one-way transmission rotating element is a one-way ratchet or one-way bearing.

Therefore, according to the present disclosure, the stepless transmission capable of operating continuously to enable instant, stable transmission of power.

DETAILED DESCRIPTION OF THE PREFERRED EMBODIMENTS

Objectives, features, and advantages of the present disclosure are hereunder illustrated with specific embodiments, depicted by the accompanying drawings, and described in detail below.

Figure 1:
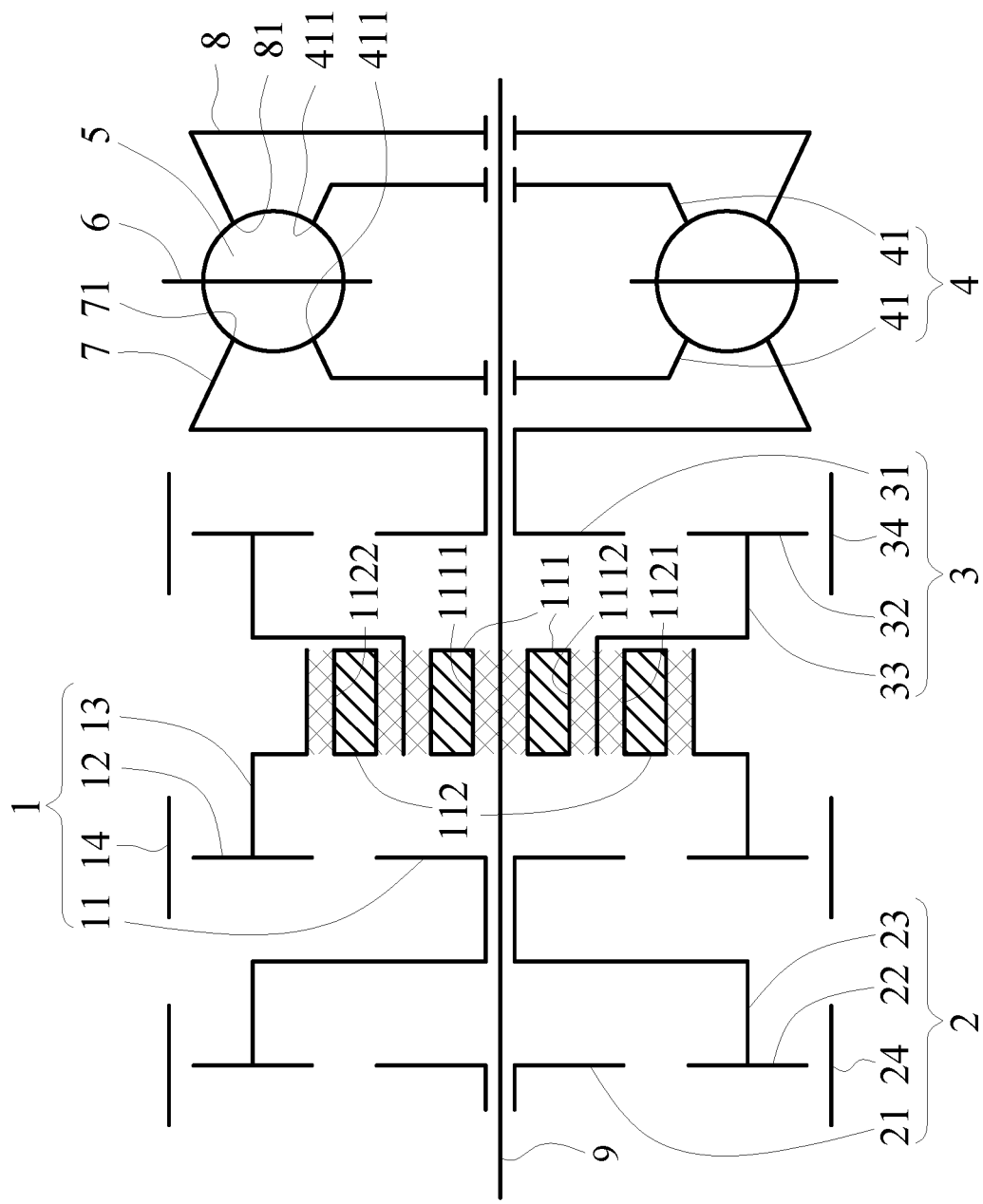
FIG. 1 is a schematic view of a stepless transmission capable of operating continuously according to a preferred embodiment of the present disclosure.
Figure 2:
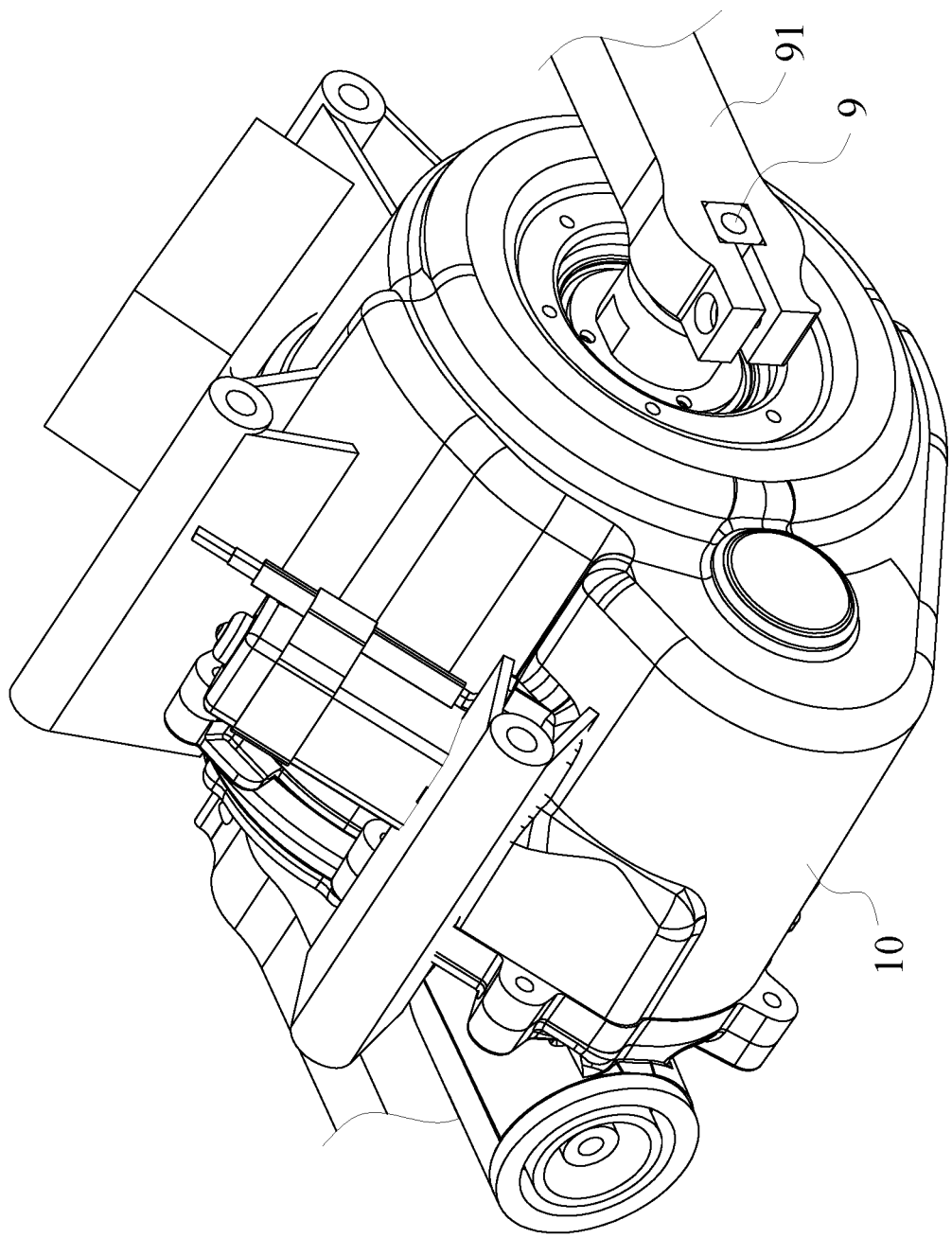
FIG. 2 is a perspective view of the stepless transmission capable of operating continuously according to a preferred embodiment of the present disclosure.
Figure 3:
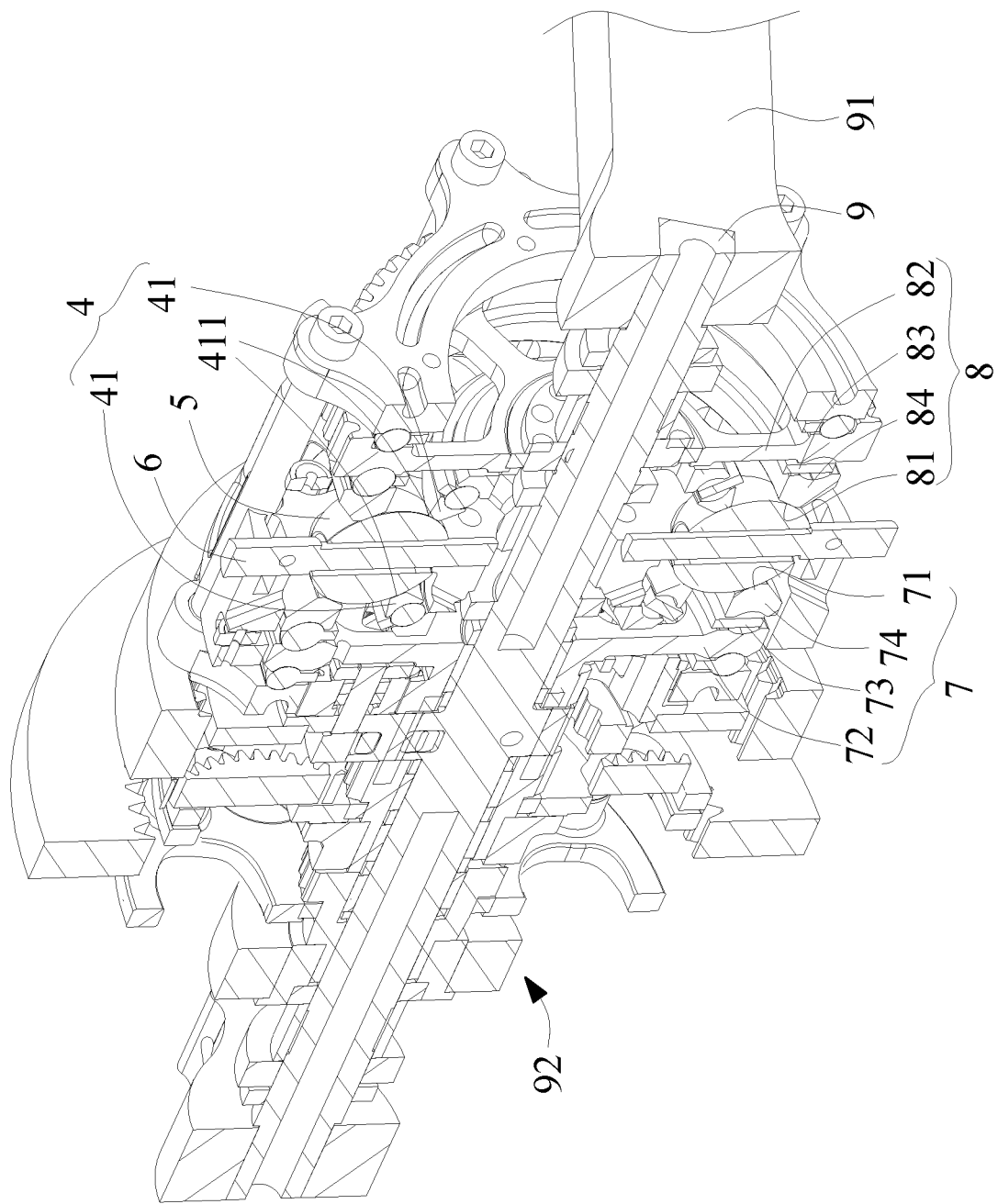
FIG. 3 is a cutaway view of the stepless transmission capable of operating continuously according to a preferred embodiment of the present disclosure, with a casing removed.
Figure 4:
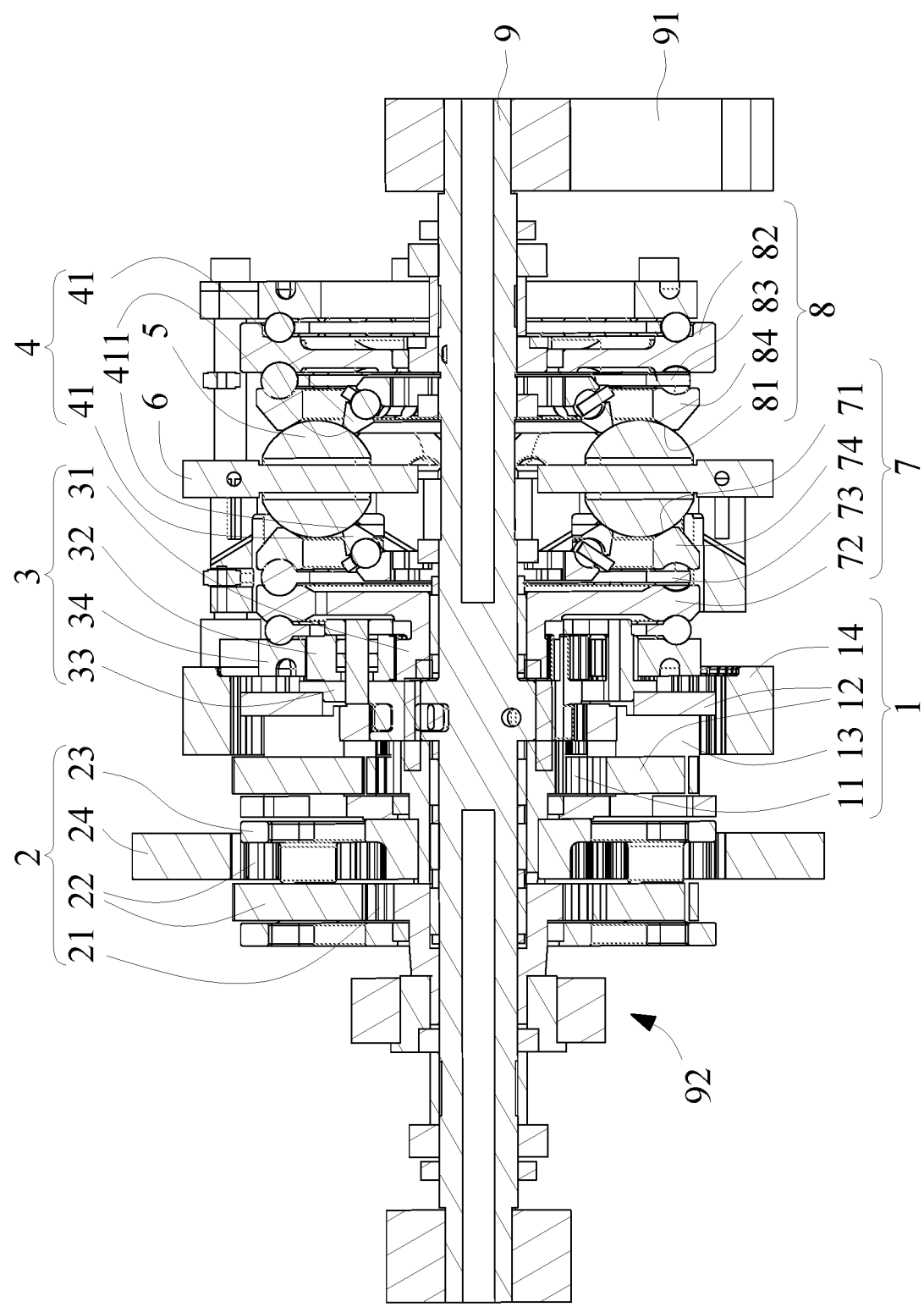
FIG. 4 is a cross-sectional view of the stepless transmission capable of operating continuously according to a preferred embodiment of the present disclosure.
Figure 5:
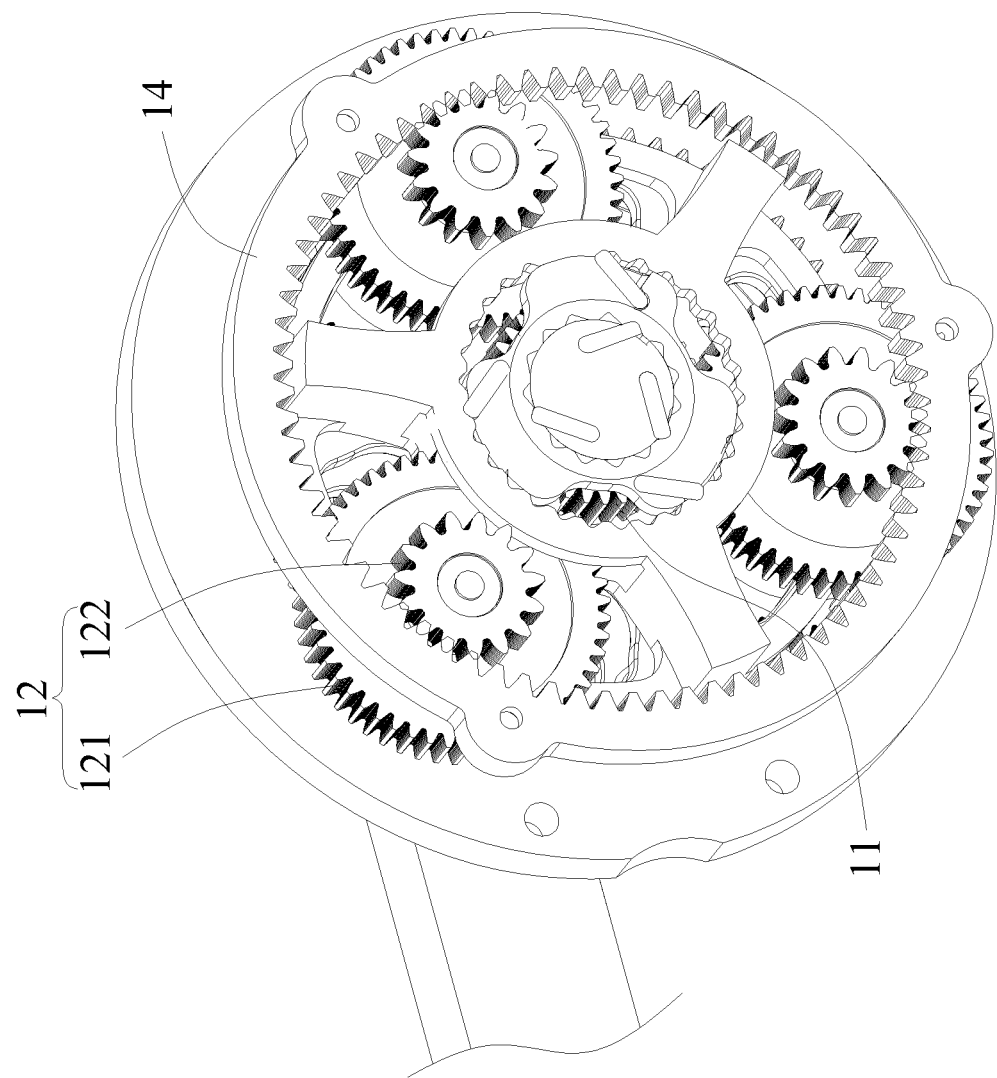
FIG. 5 is a schematic view of a first decelerating planet gear train according to a preferred embodiment of the present disclosure.
Figure 6:
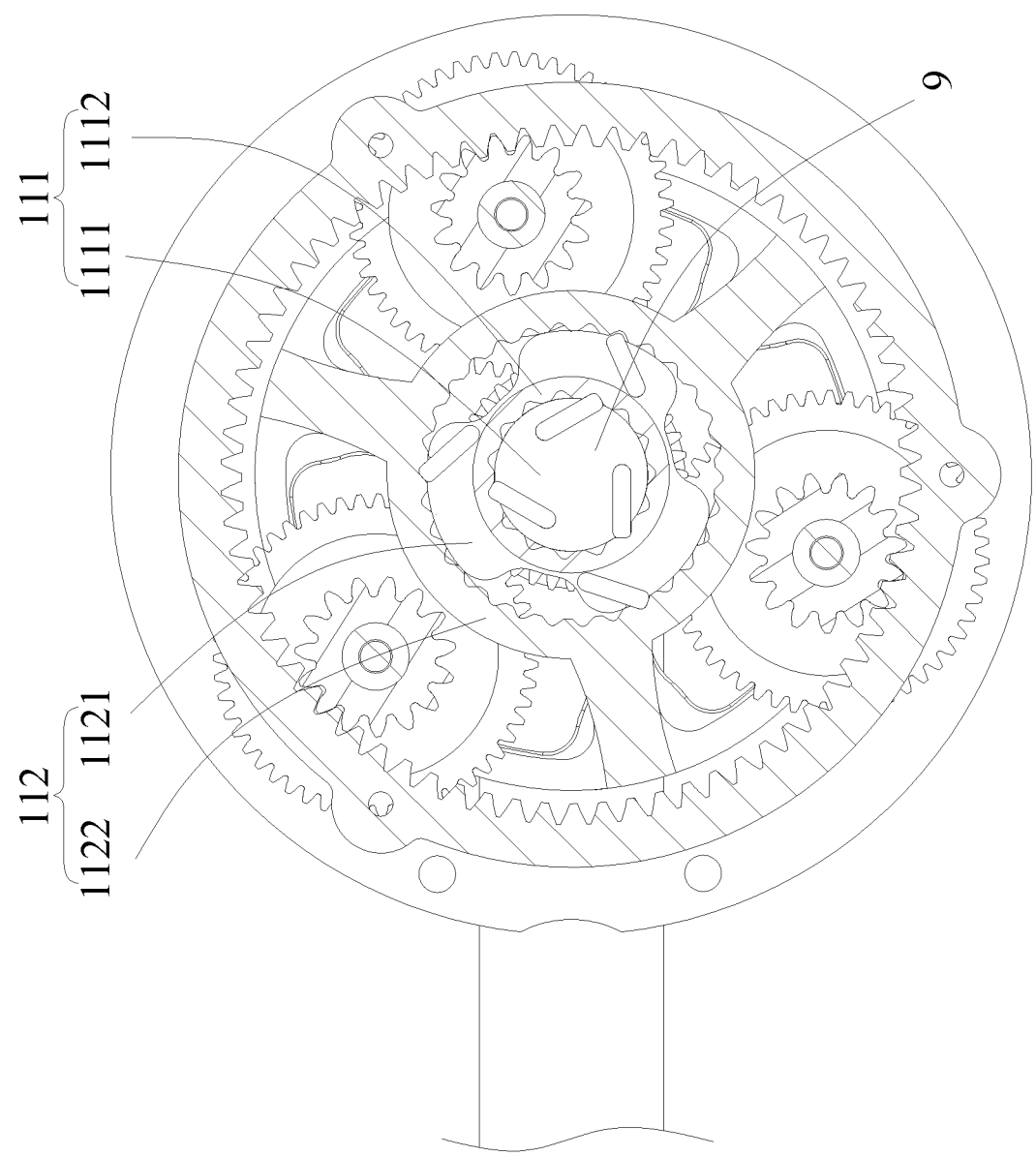
FIG. 6 is a schematic view of a first one-way transmission rotating element and a second one-way transmission rotating element according to a preferred embodiment of the present disclosure.

Referring to FIG. 1 through FIG. 6, the present disclosure provides a stepless transmission capable of operating continuously, comprising a supportive rotating element 4, a plurality of transmission spheres 5, a plurality of driving rods 6, a power input clamping rotating element 7, a power output clamping rotating element 8, an accelerating planet gear train 3, a first decelerating planet gear train 1, a transmission shaft 9, a first one-way transmission rotating element 111 and a second one-way transmission rotating element 112. According to the present disclosure, the stepless transmission capable of operating continuously is disposed in a casing 10. Referring to FIG. 1, FIG. 3 and FIG. 4, the transmission spheres 5 are disposed at the circumference of the supportive rotating element 4 and spaced apart. The transmission spheres 5 are rotatably connected to the driving rods 6, respectively. A power input rotating element 72, ball ring 73 and power input clamping ring 74 of the power input clamping rotating element 7 are identical to a conventional power input rotating element, ball ring and power input clamping ring, respectively. The power input clamping rotating element 7 further has an inward-tilting power input clamping annular surface 71. The power input rotating element 72 and the power input clamping ring 74 are either connected by a conventional helical elastomer or connected by a plurality of extensible springs (not shown). A power output rotating element 82, ball ring 83 and power output clamping ring 84 of the power output clamping rotating element 8 are identical to a conventional power output rotating element, ball ring and power output clamping ring, respectively. The power output clamping rotating element 8 further has an inward-tilting power output clamping annular surface 81. The power output rotating element 82 and the power output clamping ring 84 are either connected by a conventional helical elastomer or connected by a plurality of extensible springs (not shown). The transmission spheres 5 are movably clamped between the inward-tilting power input clamping annular surface 71, the inward-tilting power output clamping annular surface 81 and the supportive rotating element 4. Referring to FIG. 1 and FIG. 4, the accelerating planet gear train 3 has a sun gear 31, a plurality of planet gears 32, a carrier 33 and a ring gear 34. The planet gears 32 are meshed between the sun gear 31 and the ring gear 34 and rotatably connected to the carrier 33. The sun gear 31 is connected to the power input clamping rotating element 7. The ring gear 34 is fixed inside the casing 10. The gear number of the planet gears 32, the gear number of the sun gear 31 and the gear number of the ring gear 34 are adjusted such that the rotation speed of the power input clamping rotating element 7 and the sun gear 31 is greater than the rotation speed of the carrier 33; hence, the rotation speed of a manual power source 91 (for example, power generated from bicycle pedals being trodden) is increased by the accelerating planet gear train 3. Referring to FIG. 1, the first decelerating planet gear train 1 has a first sun gear 11, a plurality of first planet gears 12, a first carrier 13 and a first ring gear 14. The first sun gear 11 is connected to an auxiliary power source 92, for example, power generated from a motor. The first planet gears 12 are meshed between the first sun gear 11 and the first ring gear 14 and rotatably connected to the first carrier 13. The first carrier 13 is rotatably connected to the carrier 33. The first ring gear 14 is fixed inside the casing 10. The gear number of the first planet gears 12, the gear number of the first sun gear 11 and the gear number of the first ring gear 14 are adjusted such that the rotation speed of the carrier 33 and the first carrier 13 is greater than the rotation speed of the first sun gear 11; hence, the first decelerating planet gear train 1 decreases the rotation speed of the auxiliary power source 92. Referring to FIG. 4 and FIG. 5, in addition to being single-gear as shown in FIG. 1, the first planet gears 12 each have a first large planet gear 121 and a first small planet gear 122 connected to the first large planet gear 121. The first large planet gears 121 mesh with the first sun gear 11. The first small planet gears 122 mesh with the first ring gear 14. Referring to FIG. 1 through FIG. 4, the transmission shaft 9 is connected to the manual power source 91. Two ends of the transmission shaft 9 protrude from the casing 10 to connect with two bicycle cranks, respectively. The transmission shaft 9 is rotatably connected to the first sun gear 11, the carrier 33, the sun gear 31, the power input clamping rotating element 7, the supportive rotating element 4 and the power output clamping rotating element 8. The transmission shaft 9 is slidably connected or bearing-based connected to the first sun gear 11, the sun gear 31, the power input clamping rotating element 7, the supportive rotating element 4 and the power output clamping rotating element 8. Referring to FIG. 1, the first one-way transmission rotating element 111 is connected between the transmission shaft 9 and the carrier 33 such that the transmission shaft 9 transmits the carrier 33 unidirectionally. The first one-way transmission rotating element 111 is a one-way ratchet (or one-way bearing). The first inner rotating element 1111 of the first one-way transmission rotating element 111 is connected to the transmission shaft 9. The first outer rotating element 1112 of the first one-way transmission rotating element 111 is connected to the carrier 33. The second one-way transmission rotating element 112 is connected between the carrier 33 and the first carrier 13 such that the first carrier 13 transmits the carrier 33 unidirectionally. The second one-way transmission rotating element 112 is a one-way ratchet (or one-way bearing). The second inner rotating element 1121 of the second one-way transmission rotating element 112 is connected to the carrier 33. The second outer rotating element 1122 of the second one-way transmission rotating element 112 is connected to the first carrier 13. The transmission direction of the first one-way transmission rotating element 111 is opposite to the transmission direction of the second one-way transmission rotating element 112. Therefore, the transmission direction in which the first one-way transmission rotating element 111 transmits the first outer rotating element 1112 by the first inner rotating element 1111 is opposite to the transmission direction in which the second one-way transmission rotating element 112 transmits the second outer rotating element 1122 by the second inner rotating element 1121. Alternatively, the transmission direction in which the first one-way transmission rotating element 111 transmits the first inner rotating element 1111 by the first outer rotating element 1112 is opposite to the transmission direction in which the second one-way transmission rotating element 112 transmits the second inner rotating element 1121 by the second outer rotating element 1122. Referring to FIG. 6, in addition to the connection means shown in FIG. 1, the first one-way transmission rotating element 111 and the second one-way transmission rotating element 112 are connected together, because the first inner rotating element 1111 of the first one-way transmission rotating element 111 is integrally formed with the transmission shaft 9. The first outer rotating element 1112 of the first one-way transmission rotating element 111, the second inner rotating element 1121 of the second one-way transmission rotating element 112, and the carrier (not shown) are integrally formed. The second outer rotating element 1122 of the second one-way transmission rotating element 112 and the first carrier (not shown) are integrally formed.

According to the present disclosure, in practice, the stepless transmission capable of operating continuously works in an appropriate way described below, for example. The transmission shaft 9 inputs the manual power source 91, or the first sun gear 11 inputs the auxiliary power source 92. Referring to FIG. 1, FIG. 3 and FIG. 6, to input the manual power source 91, the transmission shaft 9 transmits power to the carrier 33 of the accelerating planet gear train 3 only through the first one-way transmission rotating element 111. Then, the carrier 33 transmits power to the planet gears 32, the sun gear 31 and the power input clamping rotating element 7 to increase the rotation speed of the power input clamping rotating element 7. Since the transmission direction of the first one-way transmission rotating element 111 is opposite to the transmission direction of the second one-way transmission rotating element 112, the transmission shaft 9 transmits power to the carrier 33 without requiring the carrier 33 to transmit power to the first carrier 13 through the second one-way transmission rotating element 112. To input the auxiliary power source 92, the first sun gear 11 transmits power to the carrier 33 of the accelerating planet gear train 3 only through the first planet gears 12, the first carrier 13 and the second one-way transmission rotating element 112, so as to decrease the rotation speed of the auxiliary power source 92. Afterward, the carrier 33 transmits power to the planet gears 32, the sun gear 31 and the power input clamping rotating element 7 so as to increase the rotation speed of the power input clamping rotating element 7. Since the transmission direction of the first one-way transmission rotating element 111 is opposite to the transmission direction of the second one-way transmission rotating element 112, the first sun gear 11 transmits power to the carrier 33 through the first planet gears 12, the first carrier 13 and the second one-way transmission rotating element 112 without requiring the carrier 33 to transmit power to the transmission shaft 9 through the first one-way transmission rotating element 111.

According to the present disclosure, the stepless transmission capable of operating continuously works advantageously. The accelerating planet gear train 3 increases the rotation speed of the power input clamping rotating element 7 such that the rotation speed of the power input clamping rotating element 7 is higher than the threshold rotation speed, allowing the power input clamping rotating element 7 and the power output clamping rotating element 8 to clamp the transmission spheres 5. Hence, according to the present disclosure, the stepless transmission capable of operating continuously transmits power instantly and steadily.

Figure 7:
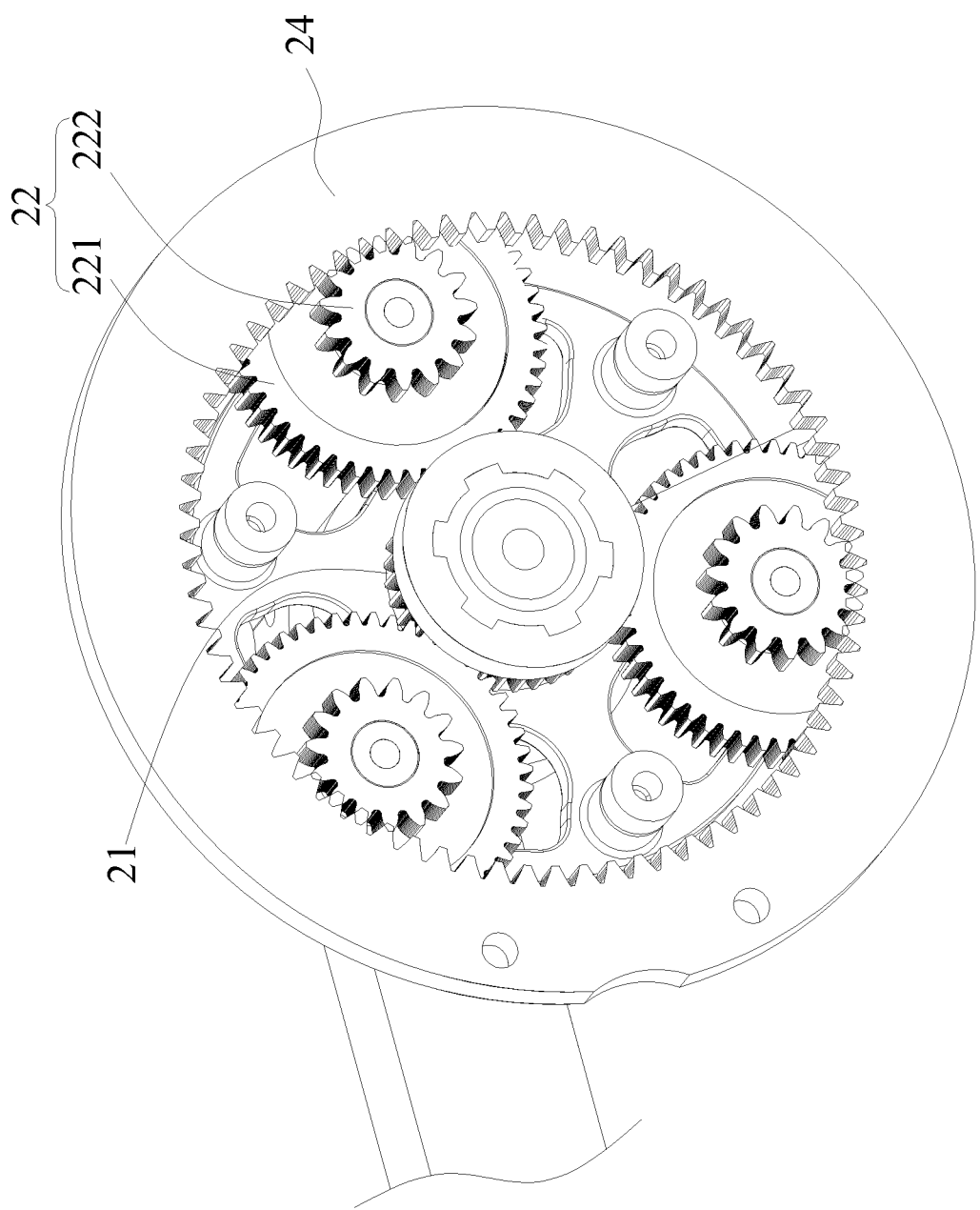
FIG. 7 is a schematic view of a second decelerating planet gear train according to a preferred embodiment of the present disclosure.

Referring to FIG. 1, the stepless transmission capable of operating continuously further comprises a second decelerating planet gear train 2 disposed between the auxiliary power source 92 and the first decelerating planet gear train 1. The second decelerating planet gear train 2 has a second sun gear 21, a plurality of second planet gears 22, a second carrier 23 and a second ring gear 24. The second planet gears 22 are meshed between the second sun gear 21 and the second ring gear 24 and rotatably connected to the second carrier 23. The second carrier 23 is connected to the first sun gear 11. The auxiliary power source 92 (such as a motor) is connected to the second sun gear 21. The second ring gear 24 is fixed inside the casing 10. The gear number of the second planet gears 22, the gear number of the second sun gear 21 and the gear number of the second ring gear 24 are adjusted such that the rotation speed of the second carrier 23 and the first sun gear 11 is less than the rotation speed of the second sun gear 21; hence, the second decelerating planet gear train 2 decreases the rotation speed of the auxiliary power source 92. The transmission shaft 9 is rotatably connected to the second sun gear 21, the second carrier 23, the first sun gear 11, the carrier 33, the sun gear 31, the power input clamping rotating element 7, the supportive rotating element 4 and the power output clamping rotating element 8. The transmission shaft 9 is slidably connected or bearing-based connected to the second sun gear 21, the second carrier 23, the first sun gear 11, the sun gear 31, the power input clamping rotating element 7, the supportive rotating element 4 and the power output clamping rotating element 8. Referring to FIG. 4 and FIG. 7, in addition to being single-gear as shown in FIG. 1, the second planet gears 22 each have a second large planet gear 221 and a second small planet gear 222 connected to the second large planet gear 221. The second large planet gears 221 mesh with the second sun gear 21. The second small planet gears 222 mesh with the second ring gear 24.

Referring to FIG. 1, FIG. 3 and FIG. 4, regarding the stepless transmission capable of operating continuously, the supportive rotating element 4 has two supportive wheels 41. The supportive wheels 41 each have an outward-tilting supportive annular surface 411. The transmission spheres 5 are supported and held between the outward-tilting supportive annular surfaces 411 and are movably clamped between the inward-tilting power input clamping annular surface 71, the inward-tilting power output clamping annular surface 81 and the outward-tilting supportive annular surfaces 411. The transmission shaft 9 is rotatably connected to the supportive wheels 41. The transmission shaft 9 is slidably connected or bearing-based connected to the supportive wheels 41. Therefore, the transmission spheres 5 are firmly disposed between the power input clamping rotating element 7, the power output clamping rotating element 8 and the supportive rotating element 4.

Referring to FIG. 1, FIG. 3 and FIG. 4, regarding the stepless transmission capable of operating continuously, inward end portions of the driving rods 6 are rotatably connected to the transmission spheres 5, respectively, in the radial direction of the supportive rotating element 4. The inward end portions of the driving rods 6 are, or are not, exposed from the transmission spheres 5. Outward end portions of the driving rods 6 are exposed from the transmission spheres 5 to control the rotation of the driving rods 6. The driving rods 6 rotate to exit the radial direction of the supportive rotating element 4 and thus approach the axial direction of the supportive rotating element 4. Therefore, according to the present disclosure, the stepless transmission capable of operating continuously within a wider range of speed changes.

The present disclosure is disclosed above by preferred embodiments. However, persons skilled in the art should understand that the preferred embodiments are illustrative of the present disclosure only, but shall not be interpreted as restrictive of the scope of the present disclosure. Hence, all equivalent modifications and replacements made to the aforesaid embodiments shall fall within the scope of the present disclosure. Accordingly, the legal protection for the present disclosure shall be defined by the appended claims.

What is claimed is:

1. A stepless transmission capable of operating continuously, comprising:
    a supportive rotating element;
    a plurality of transmission spheres disposed at a circumference of the supportive rotating element and spaced apart;
    a plurality of driving rods which the transmission spheres are rotatably connected to, respectively;
    a power input clamping rotating element having an inward-tilting power input clamping annular surface;
    a power output clamping rotating element having an inward-tilting power output clamping annular surface, with the transmission spheres movably clamped between the inward-tilting power input clamping annular surface, the inward-tilting power output clamping annular surface and the supportive rotating element;
    an accelerating planet gear train having a sun gear, a plurality of planet gears, a carrier and a ring gear, the planet gears being meshed between the sun gear and the ring gear and rotatably connected to the carrier, and the sun gear being connected to the power input clamping rotating element;
    a first decelerating planet gear train having a first sun gear, a plurality of first planet gears, a first carrier and a first ring gear, the first planet gears being meshed between the first sun gear and the first ring gear and rotatably connected to the first carrier, and the first carrier being rotatably connected to the carrier;
    a transmission shaft rotatably connected to the first sun gear, the carrier, the sun gear, the power input clamping rotating element, the supportive rotating element and the power output clamping rotating element;
    a first one-way transmission rotating element connected between the transmission shaft and the carrier, allowing the transmission shaft to transmit the carrier unidirectionally; and
    a second one-way transmission rotating element connected between the carrier and the first carrier, allowing the first carrier to transmit the carrier unidirectional, wherein a transmission direction of the first one-way transmission rotating element is opposite to a transmission direction of the second one-way transmission rotating element.

2. The stepless transmission capable of operating continuously according to claim 1, further comprising a second decelerating planet gear train having a second sun gear, a plurality of second planet gears, a second carrier and a second ring gear, the second planet gears being meshed between the second sun gear and the second ring gear and rotatably connected to the second carrier, the second carrier being connected to the first sun gear, the transmission shaft being rotatably connected to the second sun gear, the second carrier, the first sun gear, the carrier, the sun gear, the power input clamping rotating element, the supportive rotating element and the power output clamping rotating element.

3. The stepless transmission capable of operating continuously according to claim 1, wherein the supportive rotating element has two supportive wheels, the supportive wheels each having an outward-tilting supportive annular surface, with the transmission spheres supported and held between the outward-tilting supportive annular surfaces and movably clamped between the inward-tilting power input clamping annular surface, the inward-tilting power output clamping annular surface and the outward-tilting supportive annular surfaces, with the transmission shaft rotatably connected to the supportive wheels.

4. The stepless transmission capable of operating continuously according to claim 1, wherein inward end portions of the driving rods are rotatably connected to the transmission spheres, respectively, in a radial direction of the supportive rotating element, and outward end portions of the driving rods are exposed from the transmission spheres, allowing the driving rods to rotate to exit the radial direction of the supportive rotating element and thus approach an axial direction of the supportive rotating element.

5. The stepless transmission capable of operating continuously according to claim 1, wherein the first one-way transmission rotating element is a one-way ratchet or one-way bearing, and the second one-way transmission rotating element is a one-way ratchet or one-way bearing.

* * * * *